US009900836B2

(12) United States Patent
Axén et al.

(10) Patent No.: US 9,900,836 B2
(45) Date of Patent: Feb. 20, 2018

(54) NETWORK NODE, RADIO NETWORK NODE, AND METHODS FOR SENDING A SECOND SECONDARY CELL OF A WIRELESS DEVICE

(71) Applicant: Telefonaktiebolaget LM Ericsson (publ), Stockholm (SE)

(72) Inventors: Rasmus Axén, Linköping (SE); Tobias Ahlström, Ljungsbro (SE); Tobias Ljungström, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/125,265

(22) PCT Filed: Mar. 14, 2014

(86) PCT No.: PCT/SE2014/050316
§ 371 (c)(1),
(2) Date: Sep. 12, 2016

(87) PCT Pub. No.: WO2015/137857
PCT Pub. Date: Sep. 17, 2015

(65) Prior Publication Data
US 2017/0099633 A1 Apr. 6, 2017

(51) Int. Cl.
*H04W 48/20* (2009.01)
*H04W 76/06* (2009.01)
*H04W 76/02* (2009.01)

(52) U.S. Cl.
CPC ......... *H04W 48/20* (2013.01); *H04W 76/021* (2013.01); *H04W 76/025* (2013.01); *H04W 76/064* (2013.01)

(58) Field of Classification Search
CPC . H04W 48/20; H04W 76/021; H04W 76/025; H04W 76/064; H04W 48/18;
(Continued)

(56) References Cited

U.S. PATENT DOCUMENTS

2012/0302245 A1  11/2012 Huang
2013/0010763 A1* 1/2013 Chen ................. H04L 5/001
                                                    370/331
2013/0322409 A1  12/2013 Takahashi et al.

FOREIGN PATENT DOCUMENTS

EP    2323304 A2   5/2011
EP    2448350 A1   5/2012
(Continued)

OTHER PUBLICATIONS

Huawei, "SCell list provided by source eNB", 3GPP Draft; R2-104895 SCell List Provided by Source eNB, 3rd Generation Partnership Project (3GPP), Mobile Competence Centre; 650, Route Des Lucioles; F-06921 Sophia-Antipolis Cedex; France, vol. RAN WG2, No. Madrid, Spain; 20100823-20100827, Aug. 17, 2010 (Aug. 17, 2010), 3 pages, XP050605366.
(Continued)

*Primary Examiner* — Philip Sobutka
(74) *Attorney, Agent, or Firm* — Rothwell, Figg, Ernst & Manbeck, p.c.

(57) ABSTRACT

A method in a radio network node for selecting a second SCell of a wireless device. The radio network node sends (201) data to a network node, upon a request to release the wireless device from a first connected state, in which the wireless device is connected to a first PCell and configured with a first SCell. The data indicates the first PCell and the first SCell. The radio network node retrieves (202) the sent data when the wireless device enters a second connected state. Then, the wireless device is connected to a second PCell. The radio network node compares (203) the second PCell with the first PCell and the first SCell. When the second PCell is the same as one of the first PCell and the first SCell, the radio network node selects (204) as the second SCell the other of the first SCell and the first PCell.

20 Claims, 7 Drawing Sheets

(58) Field of Classification Search
CPC ... H04W 76/026; H04W 88/085; H04W 8/24; H04B 7/0413
USPC ......... 455/449, 450, 452.1, 552.1, 436, 439, 455/442, 443
See application file for complete search history.

(56) References Cited

FOREIGN PATENT DOCUMENTS

| EP | 2991403 A2 | 3/2016 |
|----|------------|--------|
| WO | 2013063885 A1 | 5/2013 |
| WO | 2013189340 A2 | 12/2013 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Reelease 11)", 3GPP Standard; 3GPP TS 36.304, 3rd Generation Partnership Project (3GPP), Mobile Competence Centre; 650, Route Des Lucioles; F-06921 Sophia-Antipolis Cedex; France, vol. RAN WG2, No. V11.6.0, Jan. 2, 2014 (Jan. 2, 2014), pp. 1-34, XP050729346.

Supplementary European Search Report dated Feb. 1, 2017 in corresponding European Application No. EP14885198.3, 6 pages.

Official Action dated Feb. 22, 2017 in corresponding European Application No. EP14885198.3, 5 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.6.0 (Dec. 2013), 349 pages.

International Search Report and Written Opinion dated Dec. 18, 2014 in International application No. PCT/SE2014/050316, 8 pages.

* cited by examiner

NETWORK NODE, RADIO NETWORK NODE, AND METHODS FOR SENDING A SECOND SECONDARY CELL OF A WIRELESS DEVICE

CROSS-REFERENCE TO RELATED APPLICATION(S)

This application is a 35 U.S.C. § 371 National Phase Entry Application from PCT/SE2014/050316, filed Mar. 14, 2014, and designating the United States.

TECHNICAL FIELD

Embodiments herein relate to a network node and a radio network node, and to methods in the network node and the radio network node. In particular they relate to selecting a second SCell of a wireless device.

BACKGROUND

Communication devices such as wireless devices are also known as e.g. user equipments (UE), mobile terminals, wireless terminals, and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cell areas, wherein each cell area being served by a radio network node. A cell is the geographical area where radio coverage is provided by the radio network node.

The radio network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Further, each radio network node may support one or several communication technologies. The radio network nodes communicate over the air interface operating on radio frequencies with the wireless terminals within range of the radio network node. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. Data transmission in LTE is controlled by the radio base station.

Upon demand on higher bandwidth and higher data rate applications, LTE-Advanced as of 3GPP Release 10 introduces Carrier Aggregation (CA).

Carrier Aggregation allows expansion of effective bandwidth delivered to a wireless device through concurrent utilization of radio resources across multiple carriers. This means that several Component Carriers (CCs) may be aggregated to form a larger overall transmission bandwidth. A wireless device that is CA capable may be configured with multiple component carriers, corresponding to multiple serving cells, from a radio network node. Then, the wireless device with reception and/or transmission capabilities for carrier aggregation may simultaneously receive and/or transmit on these multiple component carriers originating from the same radio network node. Carrier Aggregation is supported for both contiguous and non-contiguous component carriers.

It is possible to configure a wireless device to aggregate a different number of component carriers originating from the same radio network node and of possibly different bandwidths in the UL and the DL. The number of DL component carriers that may be configured depends on the DL aggregation capability of the wireless device and of the aggregation capability of the radio network node. The number of UL component carriers that may be configured depends on the UL aggregation capability of the wireless device and of the aggregation capability of the radio network node. Component carriers originating from the same radio network node need not provide the same coverage.

As mentioned above, each component carrier corresponds to a serving cell. Thus, the wireless device may have multiple serving cells, each serving cell operating on a respective component carrier.

The wireless device may connect to a primary serving cell, also referred to as a primary cell or PCell. The PCell is served by a Primary Component Carrier (PCC), originating from a serving radio network node, such as an eNB. Additionally, the wireless device may also connect to one or several secondary serving cells also referred to as secondary cells or SCells. Each SCell is served by a corresponding Secondary Component Carrier (SCC), originating from the radio network node. The PCC may be regarded as the anchor carrier for the wireless device and is thus used for basic functionalities such as radio link failure monitoring. The Radio Resource Control (RRC) connection is handled by the PCell, served by the PCC. After connection establishment, one or several SCells may be configured and activated, to provide additional radio resources.

Via RRC signaling, the wireless device may indicate to a serving radio network node its capability to support one or more SCells in the downlink, as well as one or more SCells in the uplink. The serving radio network node may alternatively receive information from another network node about the capability of the wireless device to support one or more SCells.

A wireless device camps on one cell at the time. When going from an idle to a connected mode, the wireless device attaches to the cell which the wireless device is currently camping on. The cell to which the wireless device successfully attaches becomes the PCell of this wireless device. The radio network node from which the PCell originates may then configure the wireless device with one or more SCells, if the wireless device is capable of supporting one or more SCells in the downlink, and/or one or more SCells in the uplink.

In some scenarios, there are several cells available for the radio network node to use as SCells for the wireless device. In existing solutions, the radio network node will in these cases have to either randomly select one or several suitable SCells or perform measurements to find one or several suitable SCells. One main criterion for the wireless device to be able to use a cell as an SCell is that the coverage of that cell is sufficient.

If the radio network node randomly selects an SCell which is not suitable for the wireless device, the selection procedure will have to continue or be restarted. This leads to an increased time from the moment when the wireless device has attached to the PCell until the moment when it is configured and activated with one or several suitable SCells and can benefit from carrier aggregation, as compared to a scenario in which a suitable SCell is selected at once. Measurements are also time consuming and lead to an increased time from the moment when the wireless device has attached to the PCell until the moment when it is configured and activated with one or several suitable SCells and can benefit from carrier aggregation.

Measurements as well as incorrect random selections also add additional reconfiguration efforts between the radio network node and the wireless device. This reduces wireless device's performance and the network capacity, due to extra signaling.

SUMMARY

It is therefore an object of embodiments herein to enhance the performance in a wireless communications network using carrier aggregation.

According to a first aspect of embodiments herein, the object is achieved by a method in a radio network node for selecting a second SCell of a wireless device. The radio network node sends data to a network node, upon a request to release the wireless device from a first connected state to an idle state. The wireless device is connected to a first PCell and configured with a first SCell in the first connected state. The data indicates the first PCell and the first SCell. The radio network node retrieves the sent data upon a transfer of the wireless device from the idle state to a second connected state. The wireless device is connected to a second PCell, in the second connected state. The radio network node compares the second PCell with the first PCell indicated by the retrieved data, and with the first SCell indicated by the retrieved data. When the second PCell is the same as one of the first PCell and the first SCell, the radio network node selects as the second SCell the other of the first SCell and the first PCell.

According to a second aspect of embodiments herein, the object is achieved by a radio network node for selecting a second SCell of a wireless device. The radio network node is configured to send data to a network node, upon a request to release the wireless device from a first connected state to an idle state. The wireless device is connected to a first PCell and configured with a first SCell in the first connected state. The radio network node is further configured to retrieve the sent data upon a transfer of the wireless device from the idle state to a second connected state. The wireless device is connected to a second PCell, in the second connected state. The radio network node is further configured to compare the second PCell with the first PCell indicated by the retrieved data, and with the first SCell indicated by the retrieved data. When the second PCell is the same as one of the first PCell and the first SCell, the radio network node is further configured to select as the second SCell the other of the first SCell and the first PCell.

According to a third aspect of embodiments herein, the object is achieved by a method in a network node for selection of a second SCell of a wireless device. The network node receives a first message from a radio network node. The first message comprises a request to release the wireless device from a first connected state to an idle state. The wireless device is connected to a first PCell and configured with a first SCell in the first connected state. The first message further comprises data indicating the first PCell and the first SCell. Upon a transfer of the wireless device from the idle state to a second connected state, the network node receives a second message from the radio network node. The second message indicates the wireless device. The wireless device is connected to a second PCell in the second connected state. The network node sends a response to the radio network node. The response comprises the data. The response is sent for enabling the radio network node to compare the second PCell with the first PCell indicated by the data, and with the first SCell indicated by the data. The response is further sent for enabling the radio network node to select as the second SCell the other of the first SCell and the first PCell, when the second PCell is the same as one of the first PCell and the first SCell.

According to a fourth aspect of embodiments herein, the object is achieved by a network node for selection of a second SCell of a wireless device. The network node is configured to receive a first message from a radio network node, The first message comprises a request to release the wireless device from a first connected state to an idle state. The wireless device is connected to a first PCell and configured with a first SCell in the first connected state. The first message further comprises data indicating the first PCell and the first SCell. The network node is further configured to receive a second message from the radio network node, upon a transfer of the wireless device from the idle state to a second connected state. The second message indicates the wireless device. The wireless device is connected to a second PCell in the second connected state. The network node is further configured to send a response to the radio network node. The response comprises the data. The response is sent for enabling the radio network node to compare the second PCell with the first PCell indicated by the data, and with the first SCell indicated by the data. The response is further sent for enabling the radio network node to select as the second SCell the other of the first SCell and the first PCell, when the second PCell is the same as one of the first PCell and the first SCell.

In scenarios where a wireless device connects to a radio network a second time, embodiments herein provide an improved procedure for selecting one or several SCells, as compared to existing solutions.

As compared to a random selection procedure, embodiments herein provide a procedure with an enhanced probability of finding a suitable SCell, since the procedure according to embodiments herein is based on knowledge about cells which have been used in a previous carrier aggregation configuration of the wireless device. In scenarios where the PCell used by the wireless device, when the wireless device connects to the network the second time, is the same as one of the previously used cells, the radio network node will select the other of the previously used cells as SCells. Since those cells have previously been used in a carrier aggregation configuration with the cell which is now the PCell, it is more likely that these cells provide appropriate coverage to the wireless device than randomly selected cells. Thereby, the risk of selecting SCells providing too poor coverage, and thus being unsuitable, is reduced. It is therefore less likely that the selection procedure will have to continue or be restarted. The time from the moment when the wireless device has attached to the PCell until the moment when it is configured and activated with one or several suitable SCells and can benefit from carrier aggregation may thereby be shorter than in scenarios in which one or several unsuitable SCells are selected by a random procedure. The probability that additional reconfiguration efforts and extra signaling will be needed due to a selection of an unsuitable SCell, is thus reduced as compared to a random selection procedure. The wireless devices performance and the network capacity is thereby improved.

As compared to a procedure in which measurements are used to find a suitable SCell, embodiments herein provide a procedure which is less time consuming, and requires less signaling. The wireless devices performance and the network capacity is thereby improved.

BRIEF DESCRIPTION OF THE DRAWINGS

Examples of embodiments herein are described in more detail with reference to attached drawings in which.

DETAILED DESCRIPTION

Figure 1A:
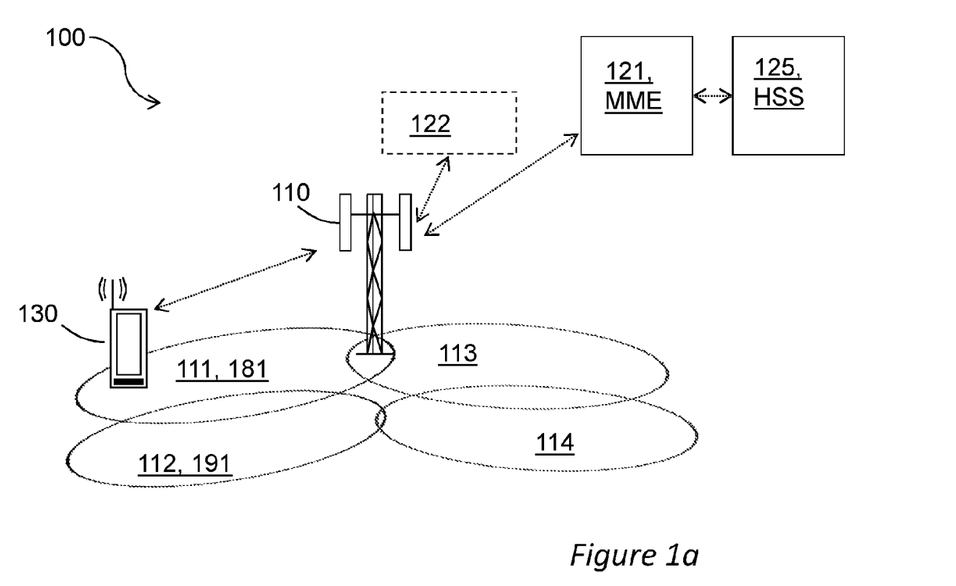
FIG. 1a schematically illustrates embodiments of a wireless communications network, in which a wireless device is in a first connected state.

FIG. 1a depicts an example of a wireless communications network 100 according to a first scenario in which embodiments herein may be implemented. The wireless communications network 100 is a wireless communication network such as an LTE-Advanced network. The embodiments may also be implemented in other networks that have adopted carrier aggregation, such as a Universal Terrestrial Radio Access Network (UTRAN) and WiFi, but also networks adopting aggregation of carriers using different radio access technologies, as well as aggregation of carriers served by two or more different serving radio network nodes.

The wireless communications network 100 depicted in FIG. 1a comprises a radio network node 110. The radio network node 110 may be a transmission point such as a radio base station, for example an eNB, an eNodeB, or an Home Node B, an Home eNode B or any other radio network node 110 capable to serve a wireless device 130 such as a user equipment or a machine type communication device in a wireless communications network. The radio network node 110 may also act as a master node to one or more secondary radio network nodes, where a secondary node also serves a wireless device. The radio network node 110 may be comprised in the RAN of the wireless communications network.

The radio network node 110 provides radio coverage to several cells by means of several component carriers. In the exemplary embodiment shown in FIG. 1a, a first cell 111, a second cell 112, a third cell, and a fourth cell 114 are depicted.

The wireless communications network 100 also comprises one or more network nodes 121, 122. In some embodiments, one of the network nodes is embodied as a control node 121, referred to as the control node 121. The responsibilities of the control node 121 comprises connection and release of bearers to a wireless device, handling of security keys, and handling of transitions between active and idle states. The control node 121 may e.g. be a Mobility Management Entity (MME). The control node may be comprised in a core network of the wireless communications network. The core network may e.g. be an Evolved Packet Core, EPC.

In some embodiments, one of the network nodes 121, 122 is embodied as a supplementary node 122, referred to as the supplementary node 122. The supplementary node 122 may be comprised in the RAN. It may comprise a data base in which data to be used by the radio network node 110 may be stored.

Furthermore, the wireless communications network 100 may comprise a subscription managing node 125, such as a Home Subscriber Server (HSS). The subscription managing node 125 supports a network control layer of the wireless communications network with subscription and session handling and may provide capabilities for mobile management, access authorization, service authorization, user identification handling etc.

A wireless device 130 operates in the wireless communications network 100. The wireless device 130 is capable of using carrier aggregation, and may thus be configured to receive and/or transmit on multiple component carriers of the radio network node 110. The wireless device 130 may e.g. be a user equipment, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network. Please note the term wireless device 130 used in this document also covers other wireless devices such as Machine to machine (M2M) devices.

FIG. 1a depicts a first connected state of the wireless device 130, in which the wireless device 130 is served by a first PCell 181, corresponding to a component carrier of the radio network node 110. In the scenario shown in FIG. 1a, the first PCell 181 is the first cell 111 of the radio network node 110. Furthermore, the wireless device 130 depicted in FIG. 1a is configured with a first SCell 191, corresponding to a another component carrier of the radio network node 110. In the scenario shown in FIG. 1a, the first SCell 191 is the second cell 112 of the radio network node 110. The first PCell 181 and the first SCell 191 represent a first carrier aggregation configuration of the wireless device 130.

Figure 1B:
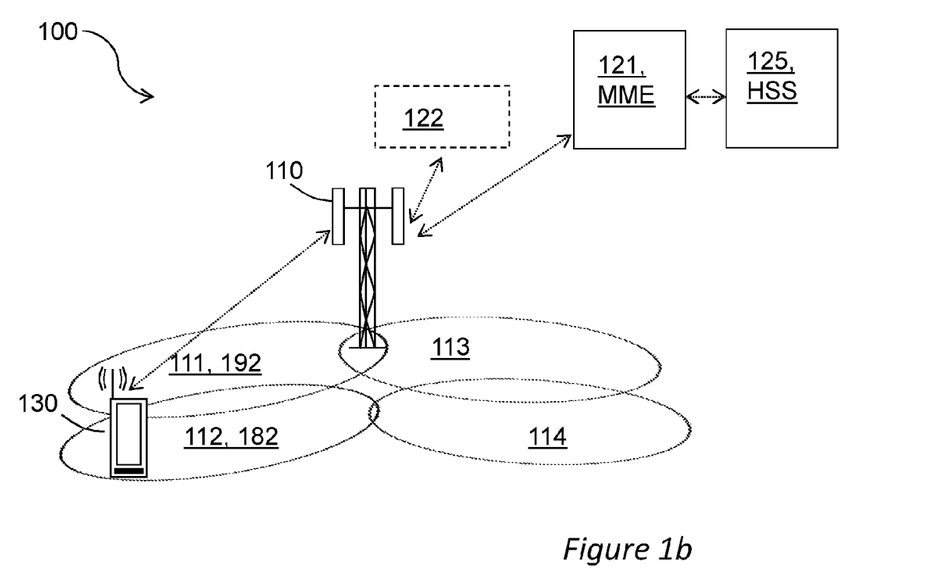
FIG. 1b schematically illustrates embodiments of a wireless communications network in which a wireless device is in a second connected state.

FIG. 1b depicts an exemplary second connected state of the wireless device 130. Before reaching the state shown in FIG. 1b, the wireless device 130 depicted in FIG. 1a has detached from the first PCell 181 so as to reach an idle state, and has now reconnected to the radio network node 110 by means of attaching to a cell served by the radio network node 110. In the exemplary embodiment shown in FIG. 2, the wireless device 130 has attached to the second cell 112. The second cell is thus the second PCell 182 of the wireless device 130. According to embodiments herein, the radio network node 110 will then select the first cell 111 as a second SCell 192 of the wireless device 130. The second PCell 182 and the second SCell 192 represent a second carrier aggregation configuration of the wireless device 130.

Figure 2:
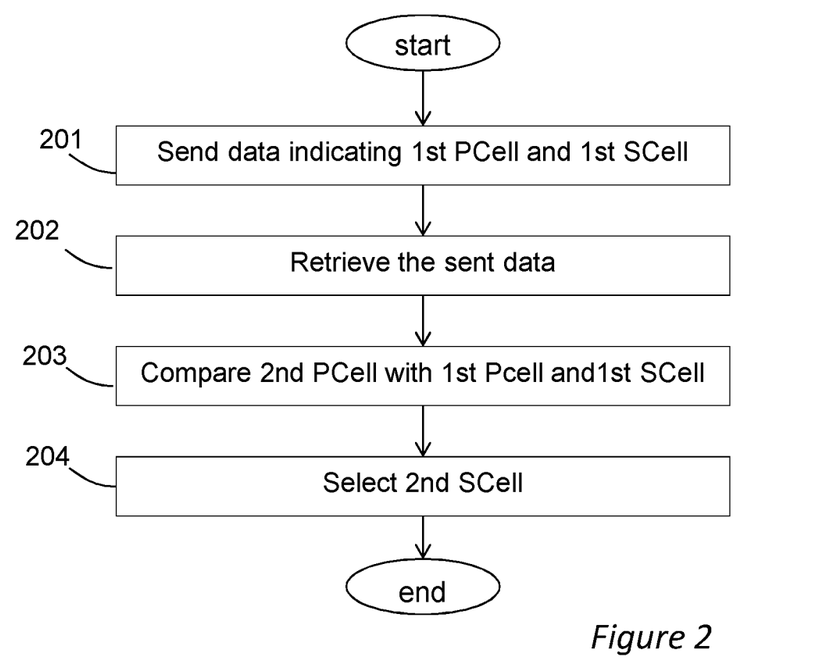
FIG. 2 is a flowchart depicting embodiments of a method in a radio network node.

Example embodiments of a method in a radio network node 110 for selecting a second SCell 192 of a wireless device 130, will now be described with reference to a flowchart depicted in FIG. 2. The method comprises the following actions, which actions may be taken in any suitable order. First, the method is described in a general way, here as seen from the radio network node's point 110 of view, relating to FIG. 2. Then, the method will be described as seen from the network node's 121 point of view, relating to FIG. 3. The method will then be described in more detail below.

Action 201

Upon a request to release the wireless device 130 from a first connected state to an idle state, the radio network node 110 sends data to a network node 121, 122. In the first connected state, the wireless device 130 has been connected to a first PCell 181 and configured with a first SCell 191. The data indicates the first PCell 181 and the first SCell 191.

In some embodiments, the data is sent to the network node 121, 122 in a first message. The first message also comprises a request to release the wireless device 130 from the first connected state to the idle state. In embodiments in which the network node is a control node 121, such as an MME, the first message may be an UE CONTEXT RELEASE REQUEST message. By sending the data in a message which is already used for signaling between the radio network node 110 and the network node 121, 122, no extra message needs to be used for sending the data, and the signaling between the radio network node 110 and the network node 121, 122 is minimized.

In some embodiments, the data comprises a cell configuration comprising the first PCell 181 and the first SCell 191.

In some other embodiments, the data comprises an identifier. Then, the radio network node 110 may also store, in the radio network node 110 itself, the identifier and a cell configuration comprising the first PCell 181 and the first SCell 191. The identifier may e.g. be a serial number. The radio network node 110 may send the serial number to the network node 121, 122, and may also store the serial number and the cell configuration in an internal data base, such that the cell configuration may be retrieved by means of searching for the serial number.

Action 202

When the wireless device once again connects to a cell of the radio network node, and thus enters a second connected state, the radio network node needs to retrieve information about the carrier aggregation configuration used in the first connected state. The radio network node 110 therefore retrieves the sent data upon a transfer of the wireless device 130 from the idle state to the second connected state. In the second connected state, the wireless device 130 is connected to a second PCell 182.

In some embodiments, the radio network node 110 sends a second message, indicating the wireless device, to the network node and receives a response from the network node 121, 122. The response may then comprise the data.

In further embodiments, in which the network node is a control node 121, such as an MME, the second message may be an INITIAL UE MESSAGE. By using a message which is already used for signaling between the radio network node 110 and the network node 121, no extra message needs to be used for sending the indication of the wireless device, and the signaling between the radio network node 110 and the network node 121, is minimized.

In embodiments in which the network node is a control node 121, such as an MME, the response may be an INITIAL CONTEXT SETUP REQUEST. By sending the data in a message which is already used for signaling between the radio network node 110 and the network node 121, no extra message needs to be used for sending the data, and the signaling between the radio network node 110 and the network node 121, is minimized.

Action 203

Now that the radio network node 110 has retrieved the data it knows about the first PCell 181 and the first SCell 191, since they are indicated by the retrieved data. The radio network node 110 then compares the second PCell 182 with the first PCell 181, and with the first SCell 191.

Action 204

If the second PCell 182 is the same as one of the first PCell 181 and the first SCell 191, the radio network node 110 selects as the second SCell 192 the other of the first SCell 191 and the first PCell 181. Thereby, a simple way of selecting a second SCell 192, which is probably suitable, is achieved.

Exemplary embodiments of the selection are described in more detail below.

Figure 3:
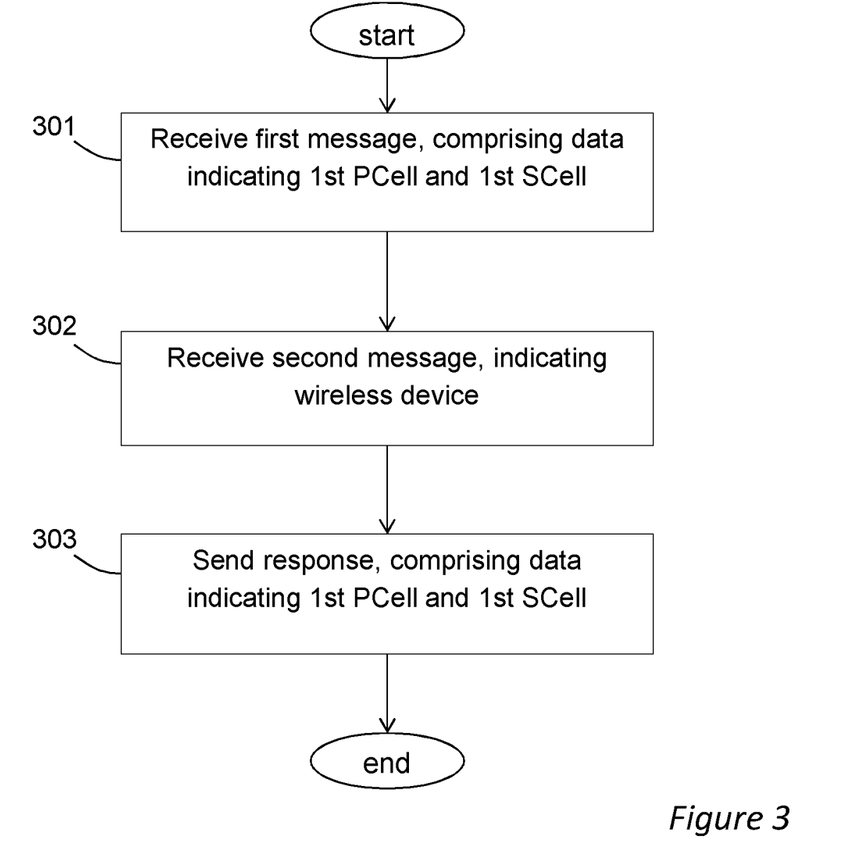
FIG. 3 is a flowchart depicting embodiments of a method in a network node.

Exemplary embodiments of a method in a network node 121, 122 for selection of a second SCell 192 of a wireless device 130, will now be described with reference to the flow chart depicted in FIG. 3. In the embodiments depicted in FIG. 3, the network node 121, 122 is embodied as control node 121. The method comprises the following actions, which actions may be taken in any suitable order.

Action 301

The network node 121 receives a first message from the radio network node 110. The first message comprises a request to release the wireless device 130 from a first connected state to an idle state. In the first connected state, the wireless device 130 has been connected to a first PCell 181 and configured with a first SCell 191. The first message further comprises data indicating the first PCell 181 and the first SCell 191.

In embodiments in which the network node is a control node 121, such as an MME, the first message may be an UE CONTEXT RELEASE REQUEST message. By receiving the data in a message which is already used for signaling between the radio network node 110 and the network node 121, no extra message needs to be used for receiving the data, and the signaling between the radio network node 110 and the network node 121 is minimized.

In some embodiments, the data comprises a cell configuration comprising the first PCell 181 and the first SCell 191.

In some other embodiments, the data comprises an identifier. The identifier may e.g. be a serial number which is also stored in the radio network node, with the first PCell 181, and the first SCell 191.

Action 302

Upon a transfer of the wireless device 130 from the idle state to a second connected state, the network node 121 receives a second message from the radio network node 110.

The second message indicates the wireless device 130. The wireless device 130 is connected to a second PCell 182 in the second connected state.

In embodiments in which the network node is a control node 121, such as an MME, the second message may be an INITIAL UE MESSAGE. By using a message which is already used for signaling between the radio network node 110 and the network node 121, no extra message needs to be used for sending the indication of the wireless device 130, and the signaling between the radio network node 110 and the network node 121, is minimized.

Action 303

The network node 121 then sends a response to the radio network node 110. The response comprises the data. This response thus enables the radio network node 110 to compare the first PCell 181 indicated by the data and the first SCell 191 indicated by the data, with the second PCell 182. When the second PCell 182 is the same as one of the first PCell 181 and the first SCell 191, the response further enables the radio network node 110 to select as the second SCell 192 the other of the first SCell 191 and the first PCell 181.

In embodiments in which the network node is a control node 121, such as an MME, the response may be an INITIAL CONTEXT SETUP REQUEST. By sending the data in a message which is already used for signaling between the radio network node 110 and the network node 121, no extra message needs to be used for sending the data, and the signaling between the radio network node 110 and the network node 121, is minimized.

Exemplary embodiments of methods described in a general way above will now be described in more detail, in relation to the combined flow chart and signaling diagram depicted in FIG. 4.

Figure 4:
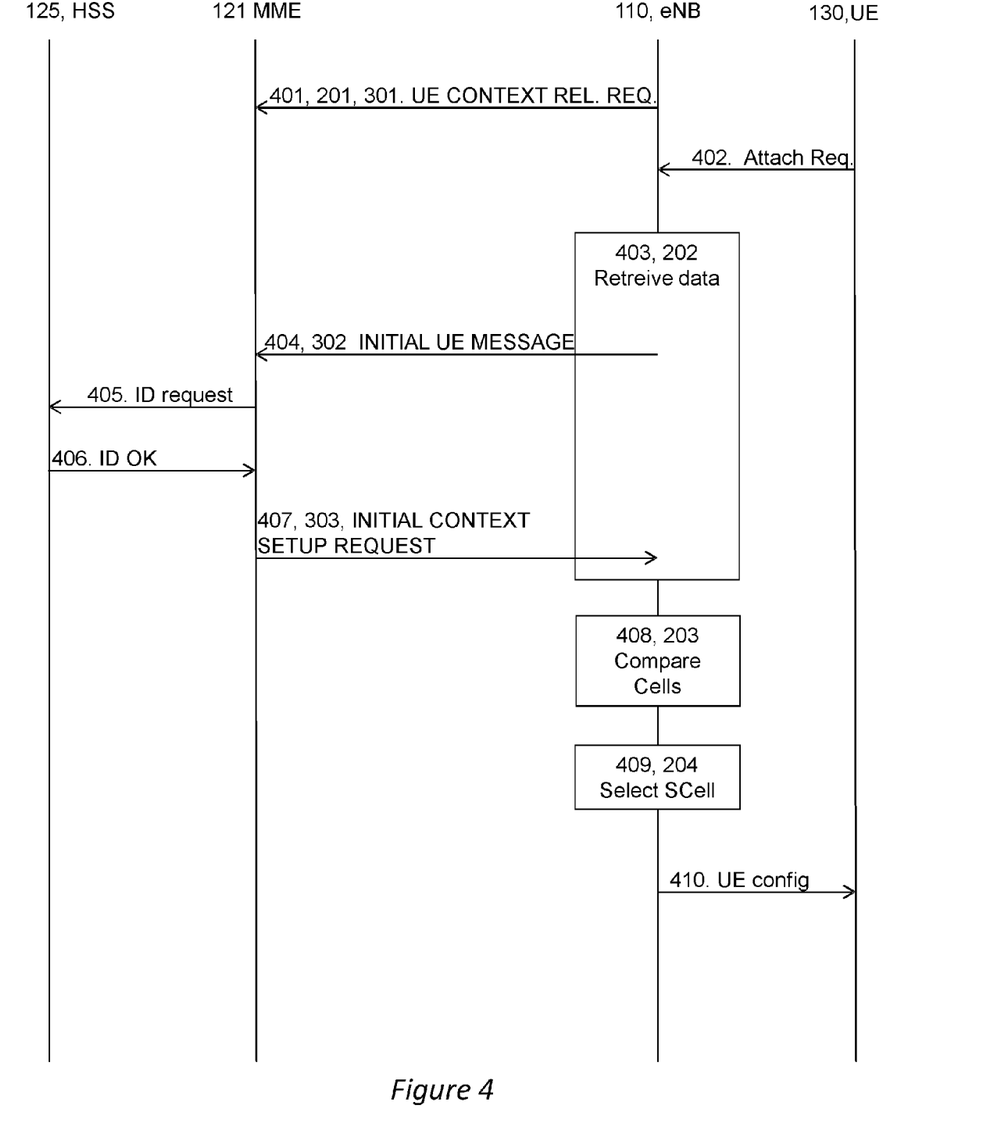
FIG. 4 is a combined signaling diagram and flowchart illustrating embodiments in a wireless network.

FIG. 4 depicts an embodiment in which the network node 121, 122 is embodied as a control node 121, referred to as an MME. FIG. 4 addresses a scenario in which a wireless device 130, referred to as a UE, is in a connected state, and is served by a radio network node 110, referred to as an eNB. The wireless device 130 is served by a first PCell 181 and is configured with a first SCell 191.

Action 401. The radio network node 110 sends the first message, such as a UE CONTEXT RELEASE REQUEST message to the control node 121. This relates to actions 201 and 301 described above. This first message may initiate a release procedure which leads to a detach of the wireless device 130 from the connected state to an idle state, which may also be referred to as an idle mode. The first message comprises data which may be used to identify the current carrier aggregation configuration of the wireless device 130. The current carrier aggregation configuration comprises the first PCell 181 and the first SCell 191.

Action 402. When the wireless device 130, which is now in an idle state, needs to attach to the radio network node 110 again, so as to reach a connected state, which is herein referred to as a second connected state, the wireless device 130 may send an attach request to the radio network node 110. This time the wireless device 130 attaches to the second PCell 182, and is in the second connected state.

Action 403. In order to be able to select a new SCell of the wireless device, the radio network node 110 now retrieves the data which was previously sent to the control node 121, which data may be used to identify the previous carrier aggregation configuration of the wireless device 130. This relates to action 202 described above.

Action 404. The radio network node 110 may retrieve the data by means of sending a second message, such as an INITIAL UE MESSAGE, to the control node 121. This relates to action 302 described above. In the second message, the wireless device 130 is indicated.

Action 405. The control node 121 may send a message comprising an identity request to a subscription managing node 125, such as a HSS. The identity request may comprise a request regarding the identity of the wireless device 130.

Action 406. The subscription managing node 125 may then send a message comprising an identity response to the control node 121. The identity response may comprise an identity of the wireless device 130.

Action 407. When the control node 121 has received the identity response, it sends a response to the radio network node 110. This relates to action 303 described above. The response may be an INITIAL CONTEXT SETUP REQUEST message. The response comprises the data. In this way the radio network node 110 has thus gained access to the data, such that it knows the carrier aggregation configuration of the wireless device 130 when it was in the first connected state.

Action 408. The radio network node 110 uses the comparison described above in relation to action 203 in order to know if the second PCell 182 was previously used as either a PCell or as a SCell.

Action 409. If the comparison shows that the second PCell 182, that is, the current PCell of the wireless device 130 in the second connected state, matches the first PCell 181, the radio network node 110 selects the first SCell 191 as the second SCell 192. If the second PCell 182 matches the first SCell, the radio network node 110 selects the first PCell 181 to be the second SCell 192. This relates to action 204 described above.

Action 410. The radio network node 110 configures the wireless device 130 with the second SCell 192.

Exemplary embodiments of methods described in a general way above will now be described in more detail, in relation to the combined flow chart and signaling diagram depicted in FIG. 5.

Figure 5:
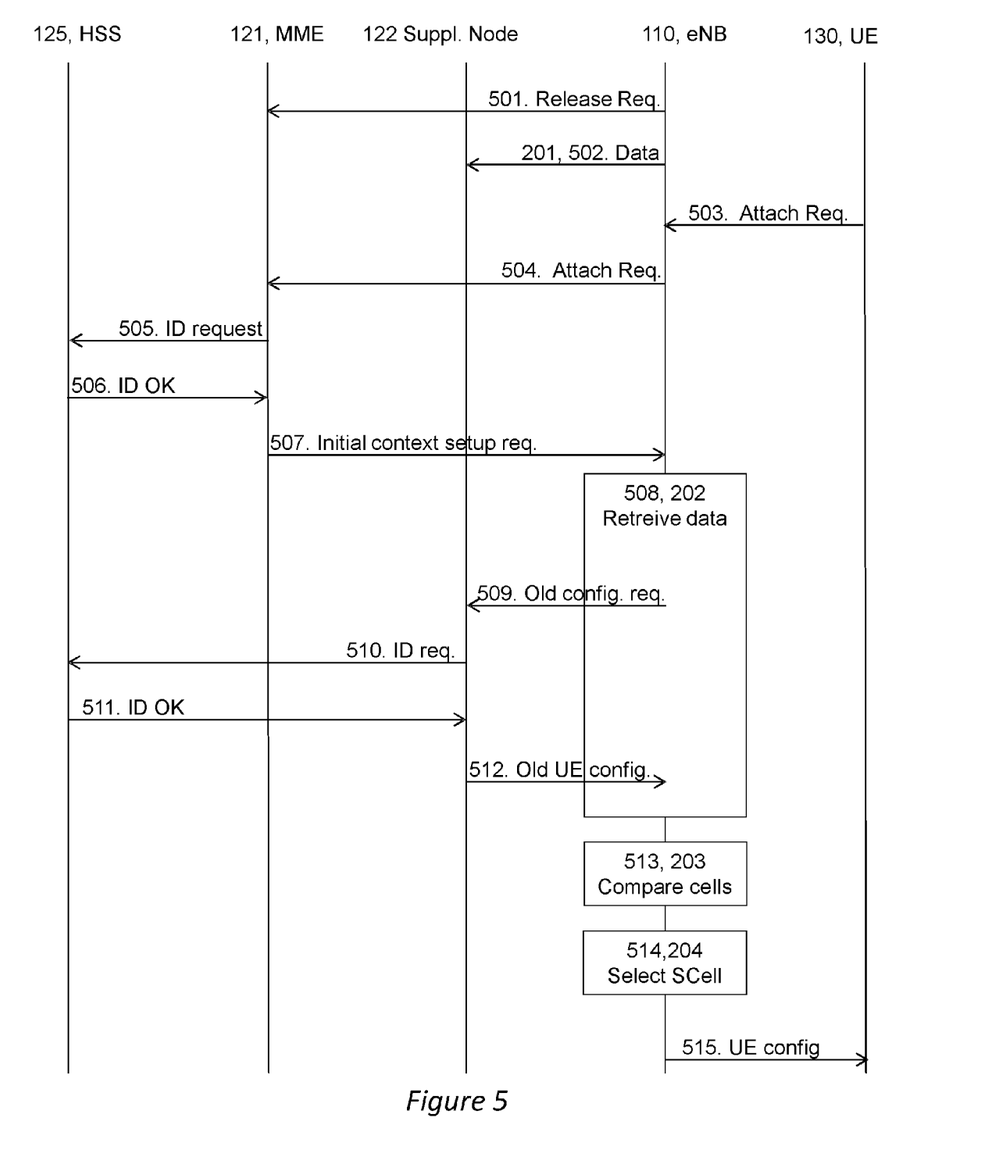
FIG. 5 is a combined signaling diagram and flowchart illustrating embodiments in a wireless network.

FIG. 5 depicts an embodiment in which the network node 121, 122 is embodied as a supplementary node 122. Similarly to FIG. 4, FIG. 5 addresses a scenario in which the wireless device 130, referred to as a UE, is in a connected state, and is served by the radio network node 110, referred to as an eNB. The wireless device 130 is served by the first PCell 181 and is configured with the first SCell 191.

Action 501. The radio network node 110 sends a first message, such as a UE CONTEXT RELEASE REQUEST message to the control node 121. This first message may initiate a release procedure which leads to a detach of the wireless device 130 from the connected state to an idle state.

Action 502. The radio network node 110 sends data identifying the first PCell 181 and the first SCell 191 to the supplementary node 122. This relates to action 201 described above.

Action 503. When the wireless device 130, which is now in an idle state, needs to attach to the radio network node 110 again, so as to reach a connected state, which is herein referred to as the second connected state, the wireless device 130 may send an attach request to the radio network node. This time the wireless device 130 attaches to a second PCell 182, and is in the second connected state.

Action 504. The radio network node 110 sends an attach request to the control node 121.

Action 505. The control node 121 may send a message comprising an identity request to a subscription managing node 125, referred to as a HSS.

Action 505. The subscription managing node 125 may then send a message comprising an identity response to the control node 121.

Action 507. The control node 121 sends an INITIAL CONTEXT SETUP REQUEST message to the radio network node 110.

Action 508. The radio network node 110 may retrieve the data. This relates to action 202 described above.

Action 509. The data retrieval may be initiated by means of sending a second message to the supplementary node 122.

Action 510. The supplementary node 122. may send an identity request to the subscription managing node 125. The identity request may relate to an identity of the wireless device 130.

Action 511. The subscription managing node 125 may then send an identity response to the supplementary node 122. The identity response may relate to an identity of the wireless device 130.

Action 512. The supplementary node 122 sends a response to the radio network node. The response comprises the data.

Action 513. The radio network node 110 uses the comparison described above in relation to action 203 in order to know if the second PCell 182 192 was previously used as either a PCell or as a SCell.

Action 514. If the comparison shows that the second PCell 182, that is, the current PCell of the wireless device 130 in the second connected state, matches the first PCell 181, the radio network node 110 selects the first SCell 191 as the second SCell 192. If the second PCell 182 matches the first SCell 191, the radio network node 110 selects the first PCell 181 to be the second SCell 192. This relates to action 204 described above.

Action 515. The radio network node 110 configures the wireless device 130 with the second SCell 192.

Some possible scenarios will now be described referring to FIG. 1a, FIG. 1b, FIG. 6 and FIG. 7.

As previously mentioned, FIG. 1a depicts a first connected state of the wireless device. The radio network node 110 serving the wireless device 130 provides radio coverage to several cells by means of several component carriers. In the exemplary embodiment shown in FIG. 1a, the cells are a first cell 111, a second cell 112, a third cell 113, and a fourth cell 114.

The wireless device 130 is in a connected state, such as an RRC CONNECT state, and has attached to the first cell 111. The first cell 111 is thus the first PCell 181 of the wireless device 130, that is, the PCell of the wireless device 130 in this first connected state. The wireless device 130 is capable of carrier aggregation and is also configured with another of the cells originating from the radio network node 110. That additional cell is therefore an SCell of the wireless device. In this exemplary embodiment, the wireless device 130 is configured with the second cell 112, and the second cell is thus the first SCell 191 of the wireless device. The wireless device 130 thus uses the first cell and the second cell of the radio network node 110 in a first carrier aggregation configuration, in the first connected state. The wireless device 130 may leave the first connected state so as to enter an idle state.

FIG. 1b illustrates a possible scenario in which the wireless device 130 depicted in FIG. 1a has transferred from the first connected state to an idle state, and then has transferred again to a connected state in which it is for a second time served by the radio network node 110. As mentioned above, the wireless device 130 has attached to the second cell 112 this time. The second cell 112 is thus the PCell of the wireless in the second connected state, and is therefore referred to as the second PCell 182. To avoid for the radio network node 110 to either select a second SCell 192 of the wireless device 130 at random, or using measurements, embodiments herein provide an improved procedure of selecting a suitable second SCell 192 may be used in this case. Since the second PCell 182 is one of the cells in the first carrier aggregation configuration, it is likely that the other of the cells used in the first carrier aggregation configuration is a suitable SCell in the second connected state. According to embodiments herein, the radio network node 110 will now select the first cell 111 as the second SCell 192. Selecting a second SCell 192 at random could have resulted in any of cells 113 and 114 being selected, and since their coverage is not appropriate for the wireless device 130 in the exemplary scenario depicted in FIG. 1b, this would have implied that a new selection of a second SCell 192 would have to be performed. Using measurements would have led to a selection of the first cell 111. In that case additional signalling would have been needed. The wireless device's performance would have been reduced due to the extra effort needed to perform these measurements. The wireless network's 100 capacity would thus have been reduced.

Figure 6:
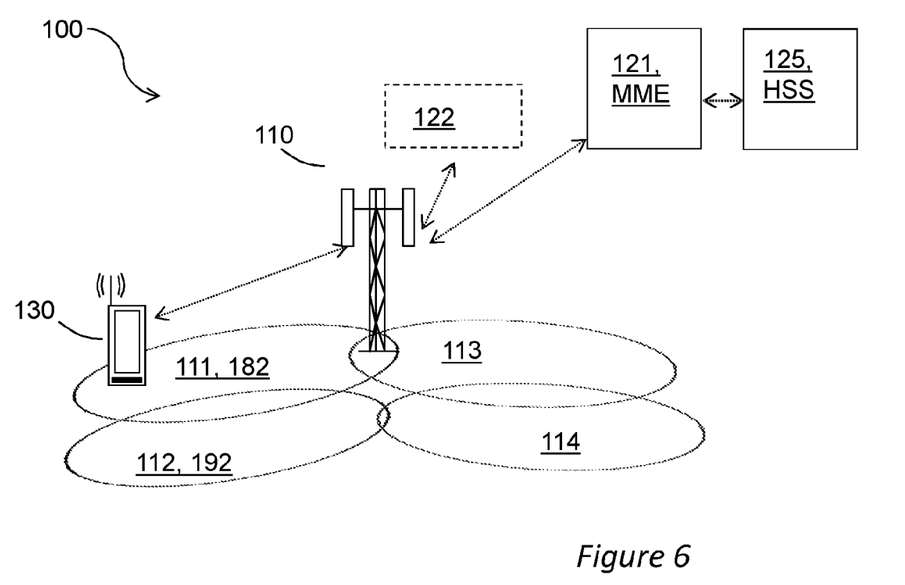
FIG. 6 schematically illustrates embodiments of a wireless communications network.

FIG. 6 depicts an alternative to FIG. 1b. FIG. 6 illustrates a possible scenario in which the wireless device 130 depicted in FIG. 1a has transferred from the first connected state to an idle state, and then has transferred again to a connected state in which it is for a second time served by the radio network node. The only difference from the scenario depicted in FIG. 1b, is that the wireless device 130 has now attached to the first cell 111 once again. The first cell 111 is thus the PCell of the wireless in the second connected state, and is therefore referred to as the second PCell 182. Since the same cell is used as a PCell in the second connected state as in the first connected state, it is likely that the SCell used in the first connected state is suitable also in the second connected state. According to embodiments herein, the radio network node 110 will now select the second cell 112 as the second SCell 192. Using existing solutions would have implied the same disadvantages as the ones discloses above in relation to FIG. 1b.

Figure 7:
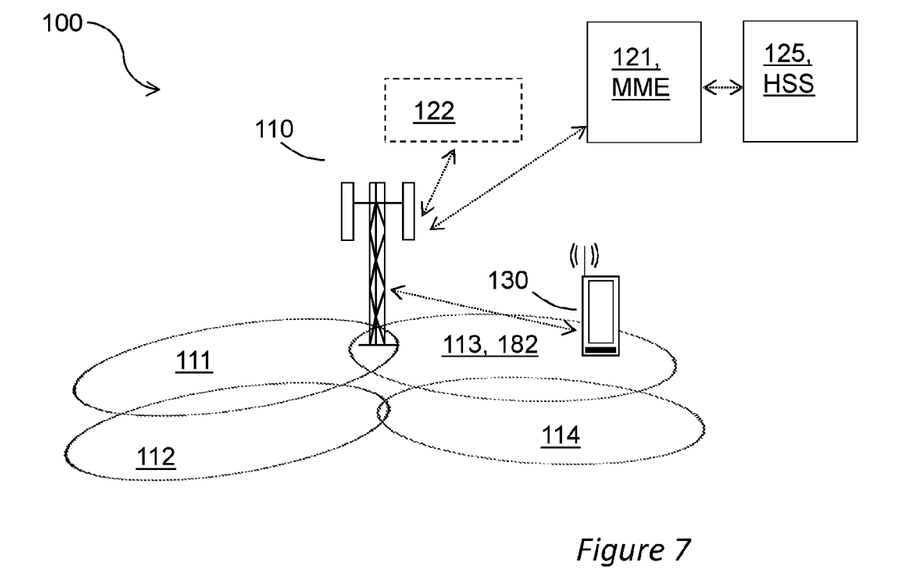
FIG. 7 schematically illustrates embodiments of a wireless communications network.

FIG. 7 illustrates yet an alternative to FIG. 1b. FIG. 7 illustrates a possible scenario in which the wireless device 130 depicted in FIG. 1a has transferred from the first connected state to an idle state, and then has transferred again to a connected state in which it is for a second time served by the radio network node. In this case, the wireless device 130 has attached to the third cell 113, which is thus the second PCell 182 of the wireless device 130. Since the third cell 113 was not present in the first carrier aggregation configuration, the procedure for selecting a second SCell 192, according to embodiments herein, may not be useful. It is likely that measurements will be needed to find an appropriate second SCell 192, such as the fourth cell 114.

It is to be noted that of the first SCell 191 and the second SCell 192 may be one or several. As an example, not illustrated, a wireless device 130 may use a first cell of a radio network node 110 as its PCell in a first connected state, whereas it is configured with a second and a third cell as SCells in this first connected state. If the wireless device 130 then uses the third cell as its PCell in the second connected state, the first cell and the second cell will according to embodiments herein be selected as SCells in the second connected state.

Figure 8:
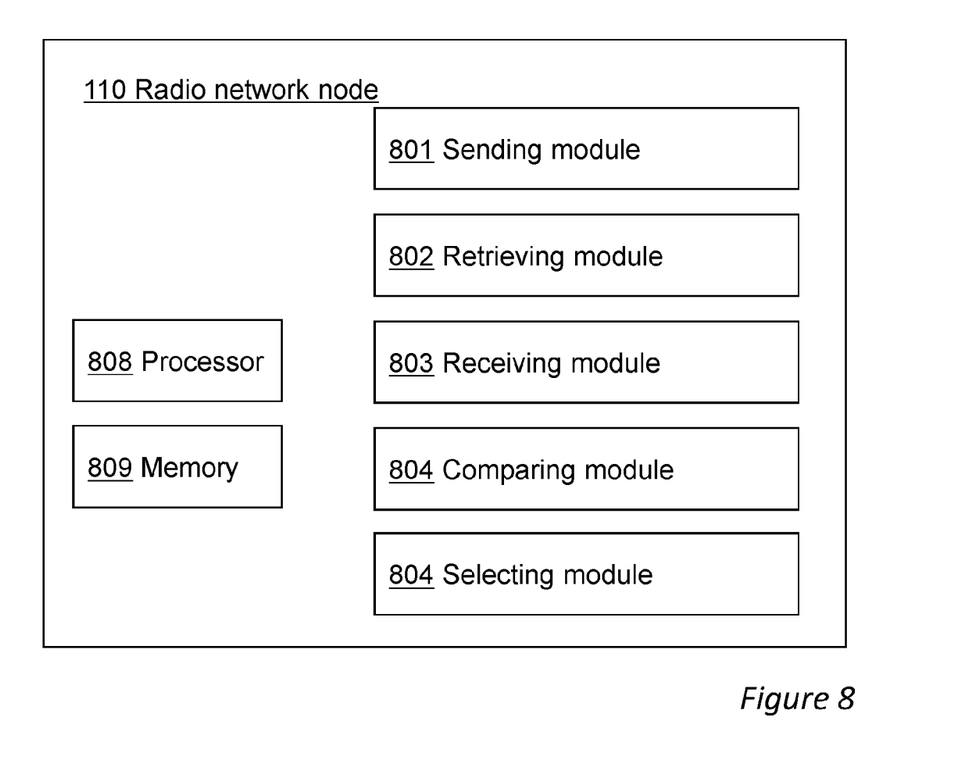
FIG. 8 is a schematic block diagram illustrating embodiments of a radio network node.

The radio network node 110 for selecting a second SCell 192 of a wireless device 130, as described above in relation to FIG. 2, is depicted in FIG. 8.

The radio network node 110 is configured to send data to a network node 121, 122 upon a request to release the wireless device 130 from a first connected state to an idle state. The wireless device 130 is connected to a first PCell 181 and configured with a first SCell 191 in the first connected state. The data indicates the first PCell 181 and the first SCell 191. In some embodiments, the radio network node 110 comprises a sending module 801, configured to send the data. The sending module 801 may be comprised in a wireless transmitter of the radio network node 110.

In some embodiments the radio network node 110 is configured to send the data to the network node 121, 122 in a first message, which first message comprises a request to release the wireless device 130 from the first connected state to the idle state.

In some embodiments the data comprises a cell configuration comprising the first PCell 181 and the first SCell 191.

In some alternative embodiments, the data comprises an identifier. In those embodiments, the radio network node 110 may further be configured to store, in the radio network node 110, the identifier and a cell configuration comprising the first PCell 181 and the first SCell 191.

The radio network node 110 is further configured to retrieve the sent data upon a transfer of the wireless device 130 from the idle state to a second connected state, in which second connected state the wireless device 130 is connected to a second PCell 182. In some embodiments, the radio network node 110 comprises a retrieving module 802, configured to retrieve the data. The retrieving module 802 may be comprised in a processing unit of the radio network node 110.

In some embodiments the radio network node 110 is configured to send a second message to the network node 121, 122, which second message indicates the wireless device 130, and to receive a response from the network node 121, 122, which response comprises the data. In some embodiments the radio network node 110 comprises a receiving module 803, configured to receive the data. The receiving module 803 may be comprised in a wireless receiver of the radio network node 110.

The radio network node 110 is further configured to compare the second PCell 182 with the first PCell 181 indicated by the retrieved data, and with the first SCell 191 indicated by the retrieved data. In some embodiments, the radio network node 110 comprises a comparing module 804, configured to compare the second PCell 182 with the first PCell 181 indicated by the retrieved data, and with the first SCell 191 indicated by the retrieved data. The comparing module 804 may be comprised in a processing unit of the radio network node 110.

The radio network node 110 is further configured to select the second SCell 192. When the second PCell 182 is the same as one of the first PCell 181 and the first SCell 191, the radio network node 110 is configured to select as the second SCell 192 the other of the first SCell 191 and the first PCell 181.

In some embodiments, the radio network node 110 comprises a selecting module 805, configured to select the second SCell 192. The selecting module 805 may be comprised in a processing unit of the radio network node 110.

Figure 9:
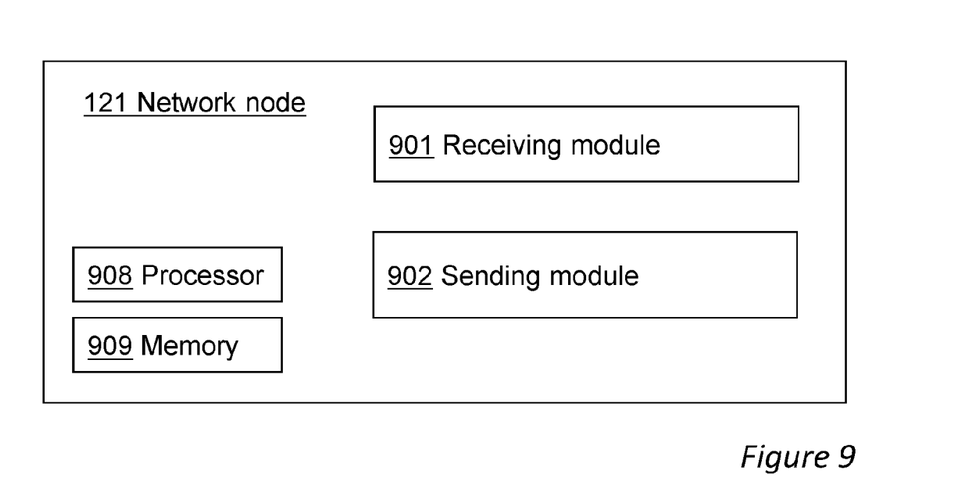
FIG. 9 is a schematic block diagram illustrating embodiments of a network node.

The embodiments herein for selecting a second SCell 192 of a wireless device 130 may be implemented through one or more processors, such as a processor 808 in the radio network node 110 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the radio network node 110. One such carrier may be in the form of a CD ROM disc. It is however feasible with other data carriers such as a memory stick. The computer program code may furthermore be provided as pure program code on a server and downloaded to the radio network node 110.

The radio network node 110 may further comprise a memory 809 comprising one or more memory units. The memory 809 is arranged to be used to store indications, metrics, determined measures of the downlink interference, cell parameters, configurations, and applications to perform the methods herein when being executed in the radio network node 110.

Those skilled in the art will also appreciate that the sending module 801, retrieving module 802, receiving module 803, comparing module 804 and selecting module 805 described above may refer to a combination of analog and digital circuits, and/or one or more processors configured with software and/or firmware, e.g. stored in a memory, that when executed by the one or more processors such as the processor 808 as described above. One or more of these processors, as well as the other digital hardware, may be included in a single Application-Specific Integrated Circuit ASIC, or several processors and various digital hardware may be distributed among several separate components, whether individually packaged or assembled into a System-on-a-Chip SoC.

The network node 121 for selecting a second SCell 192 of a wireless device 130, as described above in relation to FIG. 3, is depicted in FIG. 9.

The network node 121 is configured to receive a first message from a radio network node 110, which first message comprises a request to release the wireless device 130 from a first connected state to an idle state. the wireless device 130 is connected to a first PCell 181 and configured with a first SCell 191 in the first connected state. The first message further comprises data indicating the first PCell 181 and the first SCell 191. In some embodiments, the network node 121 comprises a receiving module 901, configured to receive the first message. The receiving module 901 may be comprised in a wireless receiver of the network node 121.

The network node 121 is further configured to receive a second message from the radio network node 110, upon a transfer of the wireless device 130 from the idle state to a second connected state. The second message indicates the wireless device 130. the wireless device 130 is connected to a second PCell 182 in the second connected state. A receiving module 901, may be configured to receive the first message.

The network node is further configured to send a response to the radio network node 110. The response comprises the data. The response enables the radio network node 110 to compare the second PCell 182 with the first PCell 181 indicated by the data, and with the first SCell 191 indicated by the data. The response further enables the radio network node 110 to select as the second SCell 192 the other of the first SCell 191 and the first PCell 181, when the second PCell 182 is the same as one of the first PCell 181 and the first SCell 191. In some embodiments, the network node 121 comprises a sending module 902, configured to send the response. The sending module 902 may be comprised in a wireless transmitter of the network node 121.

The embodiments herein for selecting a second SCell 192 of a wireless device 130 may be implemented through one or more processors, such as a processor 908 in the network node 121 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the network node 121. One such carrier may be in the form of a CD ROM disc. It is however feasible with other data carriers such as a memory stick. The computer program code may furthermore be provided as pure program code on a server and downloaded to the network node 121.

The network node 121 may further comprise a memory 909 comprising one or more memory units. The memory 909 is arranged to be used to store indications, metrics, determined measures of the downlink interference, cell parameters, configurations, and applications to perform the methods herein when being executed in the network node 121.

Those skilled in the art will also appreciate that the receiving module 901, and sending module 905 described above may refer to a combination of analog and digital circuits, and/or one or more processors configured with software and/or firmware, e.g. stored in a memory, that when executed by the one or more processors such as the processor 908 as described above. One or more of these processors, as well as the other digital hardware, may be included in a single Application-Specific Integrated Circuit ASIC, or several processors and various digital hardware may be distributed among several separate components, whether individually packaged or assembled into a System-on-a-Chip SoC.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a radio network node (RNN) for selecting a second secondary cell (SCell) of a wireless device, the method comprising:
the RNN sending to a network node data indicating a first primary cell (PCell) and indicating a first secondary cell (SCell) configured for the wireless device while the wireless device was connected to the first PCell;
the RNN obtaining the sent data upon a transfer of the wireless device from the idle state to a second connected state in which the wireless device is connected to a second PCell; and
after obtaining the sent data, the RNN selecting a new SCell for the wireless device to use while connected to the second PCell, wherein selecting the new SCell for the wireless device comprises:
the RNN comparing the second PCell with at least one of the first PCell and the first SCell; and
the RNN performing a selection process comprising at least one of:
the RNN selecting the first SCell as the new SCell for the wireless device as a result of determining, based on the comparing, that the second PCell is the same as the first PCell, and
the RNN selecting the first PCell as the new SCell as a result of determining, based on the comparing, that the second PCell is the same as the first SCell.

2. The method of claim 1, wherein the data is sent to the network node in a first message, wherein first message comprises a request to release the wireless device from the first connected state to the idle state.

3. The method of claim 1, wherein the data comprises a cell configuration comprising the first PCell and the first SCell.

4. The method of claim 1, wherein the data comprises an identifier, the method furthermore comprising:
storing, in the RNN, the identifier and a cell configuration comprising the first PCell and the first SCell.

5. The method of claim 1, wherein the retrieving comprises:
sending a second message to the network node, which second message indicates the wireless device, and
receiving a response from the network node, which response comprises the data.

6. The method of claim 1, wherein the selection process comprises:
the RNN selecting the first SCell as the new SCell for the wireless device as a result of determining, based on the comparing, that the second PCell is the same as the first PCell.

7. The method of claim 1, wherein the selection process comprises:
the RNN selecting the first PCell as the new SCell as a result of determining, based on the comparing, that the second PCell is the same as the first SCell.

8. A radio network node for selecting a second secondary cell (SCell) of a wireless device, the radio network node being configured to:
send to a network node data indicating a first primary cell (PCell) and indicating a first secondary cell (SCell) configured for the wireless device while the wireless device was connected to the first PCell;
obtain the sent data upon a transfer of the wireless device from the idle state to a second connected state, in which second connected state the wireless device is connected to a second PCell; and
after obtaining the sent data, select a new SCell for the wireless device to use while connected to the second PCell, wherein selecting the new SCell for the wireless device comprises:
compare the second PCell with at least one of the first PCell and the first SCell, and
perform a selection process comprising at least one of:
select the first SCell as the new SCell for the wireless device as a result of determining, based on the comparing, that the second PCell is the same as the first PCell, and
select the first PCell as the new SCell as a result of determining, based on the comparing, that the second PCell is the same as the first SCell.

9. The radio network node of claim 8, wherein the radio network node is configured to send the data to the network node in a first message, which first message comprises a request to release the wireless device from the first connected state to the idle state.

10. The radio network node of claim 8, wherein the data comprises a cell configuration comprising the first PCell and the first SCell.

11. The radio network node of claim 8, wherein the data comprises an identifier, the radio network node further being configured to store, in the radio network node, the identifier and a cell configuration comprising the first PCell and the first SCell.

12. The radio network node of claim 8, further being configured to:
send a second message to the network node, which second message indicates the wireless device, and
receive a response from the network node, which response comprises the data.

13. The radio network node of claim 8, wherein the selection process comprises:
selecting the first SCell as the new SCell for the wireless device as a result of determining, based on the comparing, that the second PCell is the same as the first PCell.

14. The radio network node of claim 8, wherein the selection process comprises:
selecting the first PCell as the new SCell as a result of determining, based on the comparing, that the second PCell is the same as the first SCell.

15. A method in a network node for selection of a second secondary cell (SCell) of a wireless device, the method comprising:
the network node receiving a first message comprising a request to release the wireless device from a first connected state to an idle state and further comprising data indicating a first primary cell (PCell) and a first secondary cell (SCell),
as a result of a transfer of the wireless device from the idle state to a second connected state, the network node receiving a second message transmitted by a radio network node, which second message indicates the wireless device, and
sending to the radio network node a response to the second message, which response comprises the data indicating the first PCell and the first SCell.

16. The method of claim 15, wherein the data indicating the first PCell and the first SCell comprises a cell configuration comprising the first PCell and the first SCell.

17. The method of claim 15, wherein the data indicating the first PCell and the first SCell further comprises an identifier which is also stored in the radio network node.

18. A network node for selection of a second secondary cell (SCell) of a wireless device, the network node being configured to:
receive a first message comprising a request to release the wireless device from a first connected state to an idle state and further comprising data indicating a first primary cell (PCell) and a first secondary cell (SCell),
as a result of a transfer of the wireless device from the idle state to a second connected state, receive a second message transmitted by a radio network node, which second message indicates the wireless device, and
send to the radio network node a response to the second message, which response comprises the data indicating the first PCell and the first SCell.

19. The network node of claim 18, wherein the data comprises a cell configuration comprising the first PCell and the first SCell.

20. The network node of claim 18, wherein the data comprises an identifier which is also stored in the radio network node.

* * * * *